United States Patent  
Guo et al.

(10) Patent No.: US 11,170,204 B2  
(45) Date of Patent: Nov. 9, 2021

(54) DATA PROCESSING METHOD, ELECTRONIC DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventors: Ziqing Guo, Guangdong (CN); Haitao Zhou, Guangdong (CN); Fangfang Hui, Guangdong (CN); Xiao Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 15 days.

(21) Appl. No.: 16/742,378

(22) Filed: Jan. 14, 2020

(65) Prior Publication Data  
US 2020/0151428 A1 May 14, 2020

Related U.S. Application Data

(63) Continuation of application No. PCT/CN2019/081743, filed on Apr. 8, 2019.

(30) Foreign Application Priority Data

Apr. 12, 2018 (CN) .......................... 201810327407.3  
Apr. 28, 2018 (CN) .......................... 201810403022.0

(51) Int. Cl.  
G06K 9/00 (2006.01)  
G06T 7/521 (2017.01)  
G06F 21/32 (2013.01)

(52) U.S. Cl.  
CPC ......... G06K 9/00281 (2013.01); G06F 21/32 (2013.01); G06K 9/00906 (2013.01);  
(Continued)

(58) Field of Classification Search  
CPC .......... G06K 9/00281; G06K 9/00906; G06K 9/00295; G06T 7/521; G06T 2207/10028; G06T 2207/10048; G06F 21/32  
(Continued)

(56) References Cited

U.S. PATENT DOCUMENTS

2014/0289833 A1* 9/2014 Briceno ................. H04L 63/08  
726/7  
2016/0328602 A1 11/2016 Zuo et al.  
(Continued)

FOREIGN PATENT DOCUMENTS

CN 205318544 U 6/2016  
CN 105812332 A 7/2016  
(Continued)

OTHER PUBLICATIONS

OA with English translation for CN application 201810327407.3.  
(Continued)

Primary Examiner — Jerome Grant, II  
(74) Attorney, Agent, or Firm — Young Basile Hanlon & MacFarlane, P.C.

(57) ABSTRACT

A method for data processing, an electronic device, and a non-transitory computer-readable storage medium are provided. The method may include: receiving target information associated with a face; and determining an execution environment corresponding to the target information according to a security level of the target information, and performing a processing related to the face based on the target information under the execution environment.

18 Claims, 10 Drawing Sheets

(52) U.S. Cl.
CPC .... *G06T 7/521* (2017.01); *G06T 2207/10028* (2013.01); *G06T 2207/10048* (2013.01)

(58) Field of Classification Search
USPC .......................................................... 382/118
See application file for complete search history.

(56) References Cited

U.S. PATENT DOCUMENTS

| | | | |
|---|---|---|---|
| 2019/0329814 A1* | 10/2019 | Raich | B62D 1/185 |
| 2019/0369474 A1* | 12/2019 | Lyu | H01S 5/0428 |
| 2020/0065562 A1* | 2/2020 | Zhou | G06K 9/00255 |
| 2020/0068110 A1* | 2/2020 | Guo | H04N 5/2352 |
| 2020/0125832 A1* | 4/2020 | Zhang | G06F 21/32 |
| 2020/0136818 A1* | 4/2020 | Jiang | G06F 21/6245 |
| 2020/0394531 A1* | 12/2020 | Rigotti | H04L 9/32 |

FOREIGN PATENT DOCUMENTS

| | | | | |
|---|---|---|---|---|
| CN | 106548077 | A | 3/2017 | |
| CN | 106845285 | A | 6/2017 | |
| CN | 107169483 | A | 9/2017 | |
| CN | 206672174 | U | 11/2017 | |
| CN | 206674128 | U | 11/2017 | |
| CN | 107527036 | A | 12/2017 | |
| CN | 107729836 | A | 2/2018 | |
| CN | 107832598 | A | 3/2018 | |
| CN | 108595928 | A | 9/2018 | |
| CN | 108846310 | A | 11/2018 | |
| CN | 208110631 | U | 11/2018 | |
| WO | 2005057472 | A1 | 6/2005 | |
| WO | WO 2017/053582 | * | 3/2017 | G06F 21/32 |

OTHER PUBLICATIONS

International Search Report with English translation issued in corresponding international application No. PCT/CN2019/081743.
Search Report for EP Application 19784964.9 dated Sep. 22, 2020.
Indian Examination Report for IN Application 201917054447 dated Jun. 30, 2021. (6 pages).

* cited by examiner

DATA PROCESSING METHOD, ELECTRONIC DEVICE AND COMPUTER-READABLE STORAGE MEDIUM

CROSS-REFERENCE TO RELATED APPLICATION(S)

This application is a continuation application of International Application No. PCT/CN2019/081743, filed on Apr. 8, 2019, which claims priority to and benefits of Chinese Patent Application Serial No. 201810327407.3, filed on Apr. 12, 2018, and Chinese Patent Application Serial No. 201810403022.0, filed on Apr. 28, 2018, the entire contents of all of which are incorporated herein by reference in their entireties.

TECHNICAL FIELD

The present disclosure relates to the field of image processing technologies, and more particularly, to a data processing method, a data processing apparatus, an electronic device, and a computer-readable storage medium.

BACKGROUND

With the development of face recognition technologies and structured light technologies, a face unlocking, a face payment and the like have become increasingly common in electronic devices. Through the structured light technologies, the electronic device may capture a face image and 3D face information, and the face payment and the face unlocking may be carried out according to the captured face image and 3D face information.

SUMMARY

Embodiments of the present disclosure provides a data processing method, an electronic device, and a computer-readable storage medium.

The data processing method provided in embodiments of the present disclosure includes the following. Target information associated with a face is received; an execution environment corresponding to the target information is determined according to a security level of the target information; and a processing related to the face is performed based on the target information under the execution environment.

The electronic device provided in embodiments of the present disclosure includes a camera subassembly, a first processing unit and a second processing unit. The first processing unit is configured to receive target information associated with a face; determine an execution environment corresponding to the target information according to a security level of the target information; and perform a processing related to the face based on the target information under the execution environment.

The computer-readable storage medium provided in embodiments of the present disclosure is configured to store computer programs that, when executed by a processor, implement the above data processing method.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

These and other aspects and advantages of the present disclosure will become apparent and more readily appreciated from the following descriptions made with reference to the accompanying drawings, in which.

DETAILED DESCRIPTION

In order to make purposes, technical solutions and advantages of the present disclosure clearer, the present disclosure will be further described in detail below with reference to the accompanying drawings and the embodiments. It should be understood that, the embodiments described herein are only used to explain the present disclosure rather than to limit the present disclosure.

Figure 1:
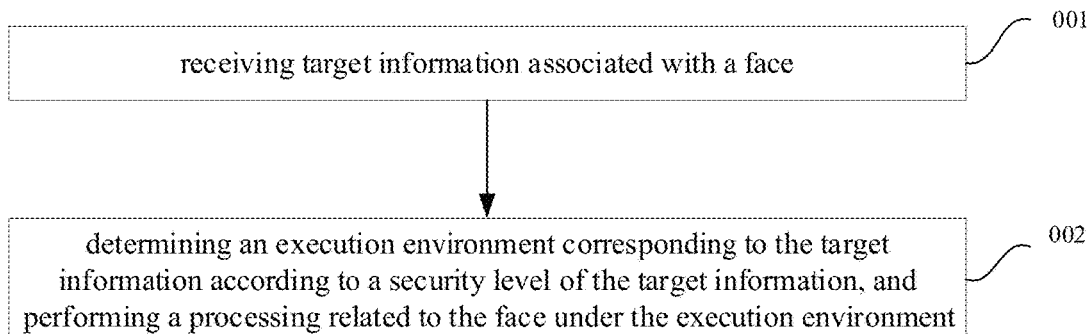
FIG. 1 is a flow chart of a data processing method according to certain embodiments of the present disclosure.

Referring to FIG. 1, the present disclosure provides a data processing method that may be applicable to an electronic device 10. The method may include acts in the following blocks.

At block 001, target information associated with a face is received.

At block 002, an execution environment corresponding to the target information is determined according to a security level of the target information, and a processing related to the face is performed based on the target information under the execution environment.

Presently, face recognition has been widely applicable to scenarios such as identity authentication, mobile payment, dynamic expression simulation. It also becomes urgent to improve security of operations such as identity authentication and mobile payment and reduce a risk of user information being stolen. With the data processing method provided in embodiments of the present disclosure, after receiving the target information associated with the face, the execution environment corresponding to the target information is determined according to the security level of the target information, and thus the processing related to the face is performed under the determined execution environment, thereby ensuring security of the information associated with the face.

The target information associated with the face may include image data for acquiring face depth information and attribute information of an application invoking face recognition.

Figure 2:
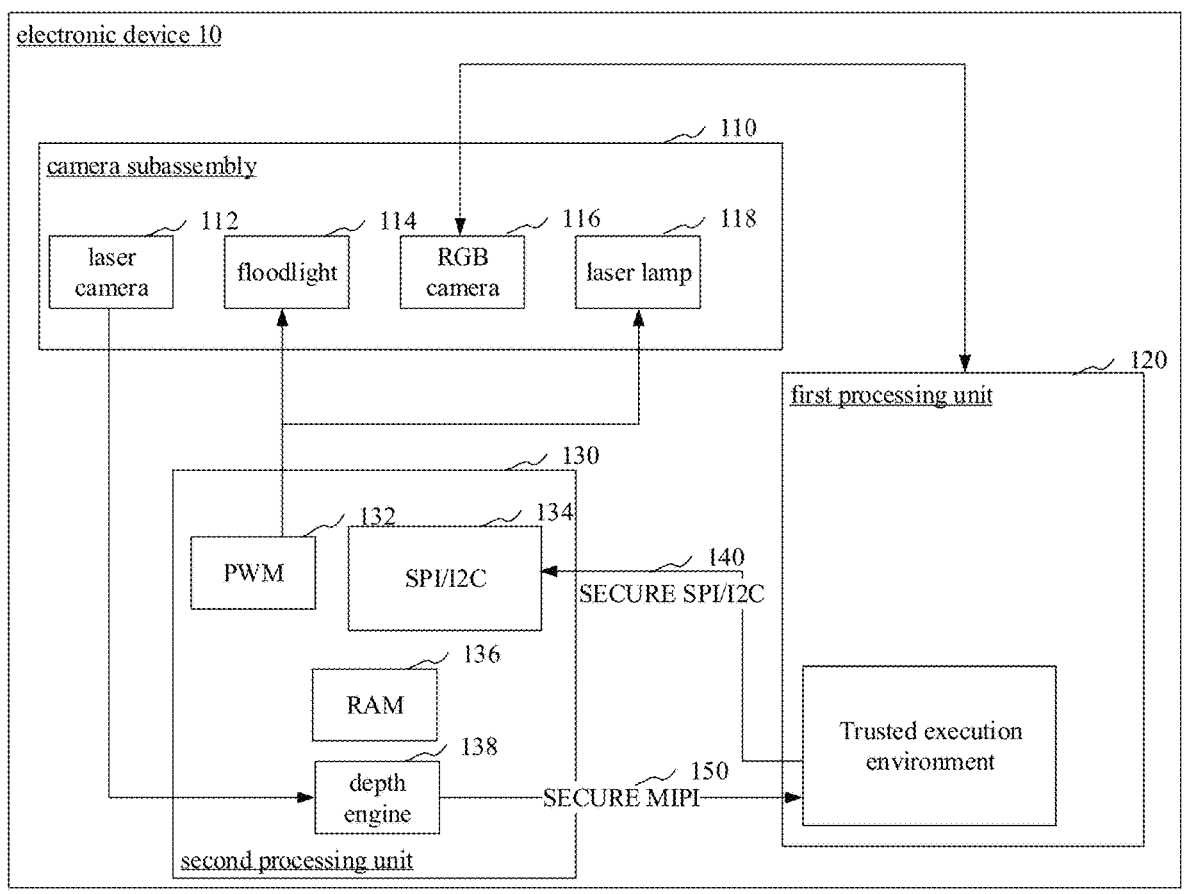
FIG. 2 is a block diagram of an electronic device according to certain embodiments of the present disclosure.

When the target information is the image data for acquiring the face depth information, as illustrated in FIG. 2, the electronic device 10 may be a mobile phone, a tablet computer, a personal digital assistant, a wearable device, or the like. The electronic device 10 may include a camera subassembly 110, a first processing unit 120, and a second processing unit 130. The first processing unit 120 may be a CPU (Central Processing Unit). The second processing unit 130 may be an MCU (Microcontroller Unit). The second processing unit 130 is coupled between the first processing unit 120 and the camera subassembly 110. The second processing unit 130 may control a laser camera 112, a floodlight 114 and a laser lamp 118 in the camera subassembly 110. The first processing unit 120 may control an RGB (Red/Green/Blue color mode) camera 116 in the camera subassembly 110.

The camera subassembly 110 includes the laser camera 112, the floodlight 114, the RGB camera 116 and the laser lamp 118. The laser camera 112 is an infrared camera for acquiring infrared images. The floodlight 114 is a point light source that may emit infrared light. The laser lamp 118 is a point light source that may emit laser light and the laser light emitted may form a pattern. When the floodlight 114 emits infrared light, the laser camera 112 may acquire an infrared image according to the reflected light. When the laser lamp 118 emits laser light, the laser camera 112 may acquire a speckle image according to the reflected light. The speckle image is an image that the pattern is deformed after the laser light forming the pattern and emitted by the laser lamp 118 is reflected.

The first processing unit 120 may include a CPU kernel operating under a TEE (Trusted execution environment) and a CPU kernel operating under a REE (Rich execution environment). The TEE and the REE are operating modes of an ARM (Advanced RISC Machines) module. The TEE has a higher security level, and only one CPU kernel in the first processing unit 120 may operate under the TEE simultaneously. Typically, an operation with a higher security level in the electronic device 10 needs to be performed in the CPU kernel under the TEE, while an operation with a lower security level may be performed in the CPU kernel under the REE.

The second processing unit 130 includes a PWM (Pulse Width Modulation) module 132, a SPI/I2C (Serial Peripheral Interface/Inter-Integrated Circuit) interface 134, a RAM (Random Access Memory) module 136 and a depth engine 138. The PWM module 132 may transmit pulses to the camera subassembly 110 and control the floodlight 114 or the laser lamp 118 to turn on, to enable the laser camera 112 to capture the infrared image or the speckle image. The SPI/I2C interface 134 is configured to receive an image acquisition instruction transmitted from the first processing unit 120. The depth engine 138 may process the speckle image to acquire a depth parallax map.

In an event that the first processing unit 120 receives a data acquisition request from the application, for example, when the application needs to perform face unlocking, and face payment, the image acquisition instruction may be transmitted to the second processing unit 130 via the CPU kernel operating under the TEE. After the second processing unit 130 receives the image acquisition instruction, the PWM module 132 transmits a pulse wave to control the floodlight 114 in the camera subassembly 110 to turn on, such that the infrared image is captured through the laser camera 112, and to control the laser lamp 118 in the camera subassembly 110 to turn on, such that the speckle image is captured through the laser camera 112. The camera subassembly 110 may transmit the captured infrared image and speckle image to the second processing unit 130. The second processing unit 130 may process the received infrared image to acquire an infrared parallax map, and may process the received speckle image to acquire a speckle parallax map or a depth parallax map. The processing on the infrared image and the speckle image by the second processing unit 130 may refer to the correction of the infrared image or the speckle image, which means removing the influence of internal and external parameters of the camera subassembly 110 on the images. The second processing unit 130 may be set into different modes, and output different image under different modes. When the second processing unit 130 is set to a speckle image mode, the second processing unit 130 processes the speckle image to acquire the speckle parallax map, and a target speckle image may be acquired according to the speckle parallax map; when the second processing unit 130 is set to a depth image mode, the second processing unit 130 processes the speckle image to acquire a depth parallax map, and a depth image may be acquired according to the depth parallax map. The depth image refers to the image with depth information. The second processing unit 130 may transmit the infrared parallax map and the speckle parallax map to the first processing unit 120. The second processing unit 130 may also transmit the infrared parallax map and the depth parallax map to the first processing unit 120. The first processing unit 120 may acquire the target infrared image according to the infrared parallax map, and acquire the depth image according to the depth parallax map. Furthermore, the first processing unit 120 may perform face recognition, face matching, liveliness detection and acquire depth information of the detected face according to the target infrared image and the depth image.

Communication between the second processing unit 130 and the first processing unit 120 is through a fixed security interface to ensure security of data transmission. As illustrated in FIG. 1, the data transmitted from the first processing unit 120 to the second processing unit 130 is through SECURE SPI/I2C 140, and the data transmitted from the second processing unit 130 to the first processing unit 120 is through SECURE MIPI (Mobile Industry Processor Interface) 150.

Alternatively, the second processing unit 130 may also acquire the target infrared image according to the infrared parallax map and acquire the depth image according to the depth parallax map, and transmit the target infrared image and the depth image to the first processing unit 120.

Alternatively, the second processing unit 130 may perform face recognition, face matching, liveliness detection and acquire depth information of the detected face according to the target infrared image and the depth image. The second processing unit 130 transmits the image to the first processing unit 120, which refers to that the second processing unit 130 transmits the image to the CPU kernel under the TEE in the first processing unit 120.

Figure 3:
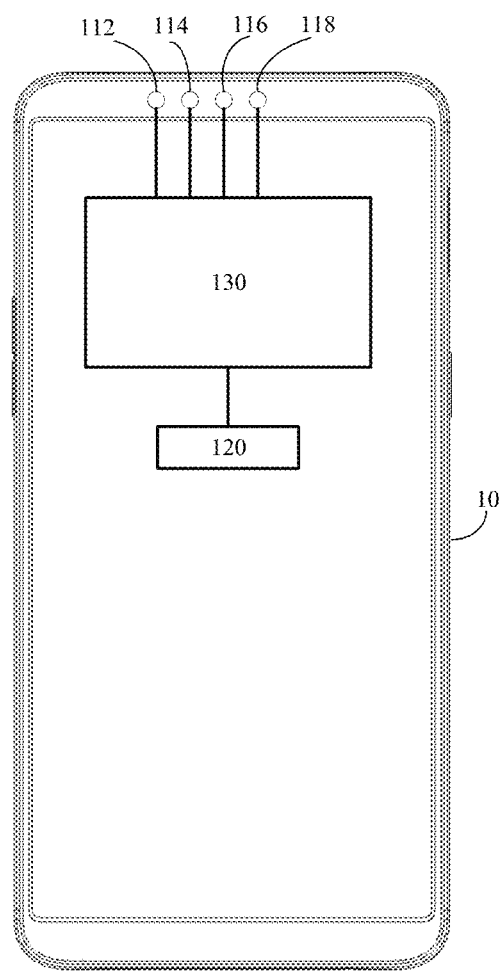
FIG. 3 is a schematic diagram of an electronic device according to certain embodiments of the present disclosure.

When the target information is the attribute information of the application invoking the face recognition, as illustrated in FIG. 3, the electronic device includes the laser camera 112, the floodlight 114, the visible-light camera 116 (i.e. the RGB camera 116), the laser lamp 118, the microcontroller unit (MCU) 130 (i.e. the second processing unit 130), and the processor 120 (i.e. the first processing unit 120). The laser camera 112, the floodlight 114, the visible-light camera 116 and the laser lamp 118 are coupled to the MCU 130. The MCU 130 is coupled to the processor 120.

Figure 4:
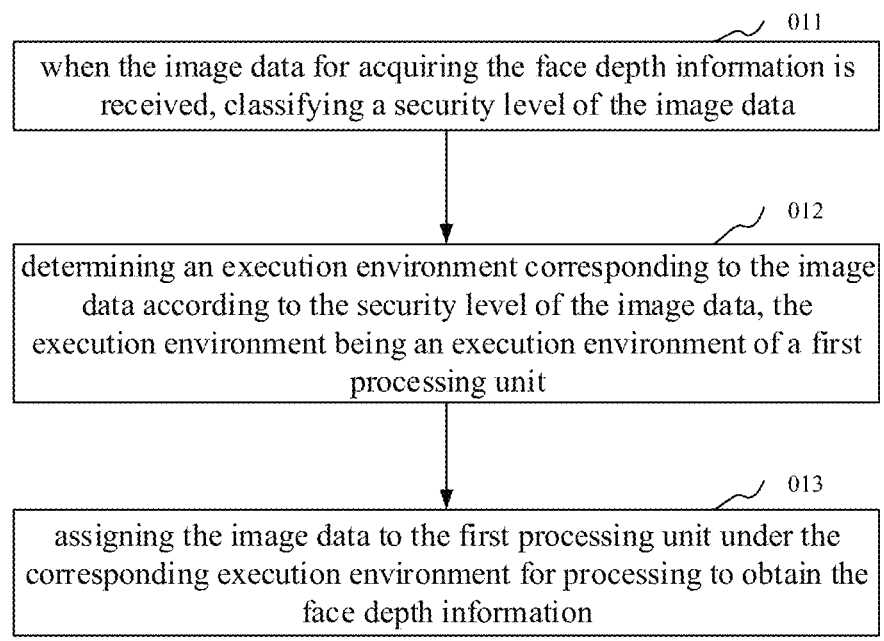
FIGS. 4 to 9 are flow charts of a data processing method according to certain embodiments of the present disclosure.

Referring to FIGS. 2 and 4, in one embodiment, the target information is the image data for acquiring the face depth information. The act of receiving the target information associated with the face at block 001 may include an act at block 011. The act of determining the execution environment corresponding to the target information according to the security level of the target information and performing the processing related to the face at block 002 may include acts at block 012 and block 013.

At block 011, when the image data for acquiring the face depth information is received, a security level of the image data is classified.

When the first processing unit 120 in the electronic device 10 receives the instruction of acquiring the face data from the side of application, the instruction may be transmitted to the second processing unit 130 coupled to the first processing unit 120, enable the second processing unit 130 to control the camera subassembly 110 to capture the infrared image and the speckle image. The first processing unit 120 in the electronic device 10 may also directly control the camera subassembly 110 according to the instruction of acquiring the face data to capture the infrared image and the speckle image. Alternatively, if the above instruction for acquiring the face data also includes acquiring a visible-light image, the first processing unit 120 in the electronic device 10 may also control the camera subassembly 110 to capture the visible-light image, i.e. the RGB image. The first processing unit 120 may be an integrated circuit that processes data in the electronic devices 10, such as CPU. The second processing unit 130 is coupled to the first processing unit 120 and the camera subassembly 110, and may preprocess the face image captured by the camera subassembly 110, and transmit the intermediate image acquired by preprocessing to the first processing unit 120. Alternatively, the second processing unit 130 may be an MCU.

The camera subassembly 110 may transmit the image to the second processing unit 130 or the first processing unit 120 after capturing the image according to the above instruction. Alternatively, the camera subassembly 110 may transmit the infrared image and the speckle image to the second processing unit 130 and transmit the RGB image to the first processing unit 120; or the camera subassembly 110 may also transmit the infrared image, the speckle image and the RGB image to the first processing unit 120. When the camera subassembly 120 transmits the infrared image and the speckle image to the second processing unit 130, the second processing unit 130 may process the acquired images to acquire the infrared parallax map and the depth parallax map, and transmit the acquired infrared parallax map and depth parallax map to the first processing unit 110.

When the first processing unit 110 receives the image data directly transmitted from the camera subassembly 110 or the intermediate image processed by the second processing unit 130, it will classify the security level of the received image data. The security level of each image data may be preset in the first processing unit 120. Alternatively, the image data received by the first processing unit 120 may include the infrared image, the speckle image, the infrared parallax map, the depth parallax map, and the RGB image. Three security levels may be preset in the first processing unit 120, including a first level, a second level and a third level, which are gradually reduced in the security from the first level to the third level. According to the speckle image and the depth parallax image, the face depth information may be acquired, so the speckle image and the depth parallax map may be set as the first level; the face recognition may be performed according to the infrared image and the infrared parallax image, so the infrared image and the infrared parallax image may be set as the second level; and the RGB image may be set as the third level.

At block 012, an execution environment corresponding to the image data is determined according to the security level of the image data. The execution environment is an execution environment of the first processing unit 120.

The first processing unit 120 may operate under different execution environments, such as the TEE and the REE. The first processing unit 120 may operate under the TEE or REE. For example, if the first processing unit 120 is a CPU, when the CPU in the electronic device 10 includes a plurality of CPU kernels, there is only one CPU kernel that may operate under the TEE, and other CPU kernels may operate under the REE. When the CPU kernel is operating under the TEE, the CPU kernel has a higher security level. When the CPU kernel is operating under the REE, the CPU kernel has a lower security level. Alternatively, the electronic device 10 may determine that the image data with the first level correspond to the TEE, the image data with the third level correspond to the REE, and the image data with the second level correspond to the TEE or REE.

At block 013, the image data is assigned to the first processing unit 120 under the corresponding execution environment for processing to acquire the face depth information.

After acquiring the security level of each image data and the execution environment corresponding to the security level, the electronic equipment 10 may assign the acquired image data to the first processing unit 120 under the corresponding execution environment for processing. Alternatively, the speckle image and the depth parallax map may be assigned to the first processing unit 120 under the TEE for processing, the RGB image may be assigned to the first processing unit 120 under the REE for processing, and the infrared image and the infrared parallax map may be assigned to the first processing unit 120 under the TEE for processing or the first processing unit 120 under the REE for processing. The first processing unit 120 may perform face recognition according to the infrared image or the infrared parallax map to detect whether there is a face in the acquired infrared image or in the acquired infrared parallax map. If there is the face in the infrared image or in the infrared parallax map, the electronic device 10 may match the face in the infrared image or in the infrared parallax map with the face stored in the electronic device 10 to detect whether the face in the infrared image or in the infrared parallax map is the stored face. The first processing unit 120 may acquire the depth information of the face according to the speckle image or the depth parallax map, and the face depth information refers to three-dimensional information of the face. The first processing unit 120 may also perform face recognition according to the RGB image to detect whether there is the face in the RGB image and whether the face in the RGB image matches the stored face.

Typically, when the first processing unit 120 is the CPU, there is only one CPU kernel in the CPU, which may operate under the TEE. When all image data are processed by CPU under the TEE, the CPU processing efficiency is relatively low.

With the data processing method provided in embodiments of the present disclosure, the first processing unit 120 may classify the image data with the security level after acquiring the image data, the execution environment corresponding to the image data may be determined according to the security level of the image data, and the image data may be assigned to the first processing unit 120 under the corresponding execution environment for processing, thus the efficiency of processing the image data is improved by different assignments on the image data.

Alternatively, the image data may include a face image captured by the camera subassembly 110 and/or an intermediate image acquired by the second processing unit 130 through processing the face image.

The camera subassembly 110 in the electronic device 10 may capture the infrared image, the speckle image and the RGB image. The camera subassembly 110 may directly transmit the captured infrared image and speckle image to the first processing unit 120, or the camera subassembly 110 may directly transmit the captured infrared image, speckle image and RGB image to the first processing unit 120; the camera subassembly 110 may also transmit the infrared image and the speckle image to the second processing unit 130 and transmit the RGB image to the first processing unit 120, and the second processing unit 130 transmits the intermediate image acquired by processing the infrared image and the speckle image to the first processing unit 120.

Alternatively, the image data may include the infrared image and the speckle image captured by the camera subassembly 110. A time interval between a first moment of capturing the infrared image by the camera subassembly 110 and a second moment of capturing the speckle image by the camera subassembly 110 is less than a first threshold.

The second processing unit 130 may control the floodlight 114 in the camera subassembly 110 to turn on and the infrared image may be captured through the laser camera 112. The second processing unit 130 may also control the laser lamp 118 in the camera subassembly 110 to turn on and the speckle image may be captured through the laser camera 112. To ensure the consistency of contents of the infrared image and the speckle image, the time interval between the first moment of capturing the infrared image by the camera subassembly 110 and the second moment of capturing the speckle image by the camera subassembly 110 should be less than the first threshold. For example, the time interval between the first moment and the second moment is less than 5 milliseconds. A floodlight controller and a laser lamp controller may be set in the camera subassembly 110. The second processing unit 130 may control the time interval between the first moment of capturing the infrared image by the laser camera 112 and the second moment of capturing the speckle image by the laser camera 112 through controlling the time interval for emitting pulses by the floodlight controller or by the laser lamp controller.

With the data processing method provided in embodiments of the present disclosure, the time interval between capturing the infrared image and capturing the speckle image by the laser camera 112 is lower than the first threshold, which may ensure the consistency of the captured infrared image and speckle image, avoid large errors between the infrared image and the speckle image, and improve the accuracy of data processing.

Alternatively, the image data may include the infrared image and the RGB image captured by the camera subassembly 110. The infrared image and the RGB image are simultaneously captured by the camera subassembly 110.

When the image acquisition instruction also includes the acquisition of the RGB image, the second processing unit 130 controls the laser camera 112 to capture the infrared image, and the first processing unit 120 controls the RGB camera 116 to capture the RGB image. To ensure the consistency of the captured images, a timing synchronization line may be added between the laser camera 112 and the RGB camera 116, so that the camera subassembly 110 may capture the infrared image and the RGB image simultaneously.

With the data processing method provided in embodiments of the present disclosure, by controlling the camera subassembly 110 to capture the infrared image and the RGB image simultaneously, it may ensure the consistency of the captured infrared image and RGB image and improve the accuracy of image processing.

Alternatively, assigning the image data to the first processing unit 120 under the corresponding execution environment for processing may include the following. A set of features in the image data is extracted; and the set of features is assigned to the first processing unit under the execution environment corresponding to the image data for processing.

After the image data is acquired by the first processing unit 120, the set of features in the image data may be extracted, and the set of features in the image data may be assigned to the first processing unit 120 under the execution environment corresponding to the image data for processing. Alternatively, the first processing unit 120 may recognize the face region of the received image data, extract the face region and assign the face region into the first processing unit 120 under the execution environment corresponding to the image data for processing. Furthermore, the first processing unit 120 may extract information of face feature points in each received image data, and assign the information of face feature points in each image data to the first processing unit 120 under the execution environment corresponding to each image data for processing. When the first processing unit assigns the set of features to the first processing unit 120 under the execution environment corresponding to the image data, the first processing unit first searches the image data from which the set of features is extracted, and acquires the execution environment corresponding to the image data, and then assigns the set of features extracted from the image data to the first processing unit 120 under the execution environment corresponding to the image data for processing.

With the data processing method provided in embodiments of the present disclosure, after receiving the image data, the first processing unit 120 may extract the set of features in the image data, and the set of features of the image data is assigned to the first processing unit 120 for processing, which reduces a processing capacity of the first processing unit 120 and improves the processing efficiency.

Alternatively, before acquiring the face depth information, the data processing method further includes the following acts.

A face recognition and a liveness detection is performed according to the image data.

It is determined that the face recognition on the image data passes and a detected face is live.

When receiving the image data, the first processing unit 120 may perform the face recognition and the liveness detection according to the image data. The first processing unit 120 may detect whether there is a face in the infrared image or in the infrared parallax map. When there is the face in the infrared image or in the infrared parallax map, the first processing unit 120 may match the face in the infrared image or in the infrared parallax map with the stored face, and detect whether the face in the infrared image or in the infrared parallax map is successfully matched with the stored face. If the matching is successful, the first processing unit 120 may acquire the face depth image based on the speckle image or the depth parallax map, and perform the liveness detection based on the face depth image. The liveness detection based on the face depth image includes the following. A face region is searched in the face depth image to detect whether there is depth information in the face region and whether the depth information conforms to a face stereo rule. If there is the depth information in the face region in the face depth image and the depth information conforms to the face stereo rule, the face is live. The face stereo rule is a rule with three-dimensional depth information of the face. Alternatively, the first processing unit may also employ an artificial intelligence model to perform artificial intelligence recognition on the image data, to acquire the texture of the face surface and check whether a direction, a density, a width and the like of the texture conform to the face rule. If conforming to the face rule, the face is judged to be live.

Figure 5:
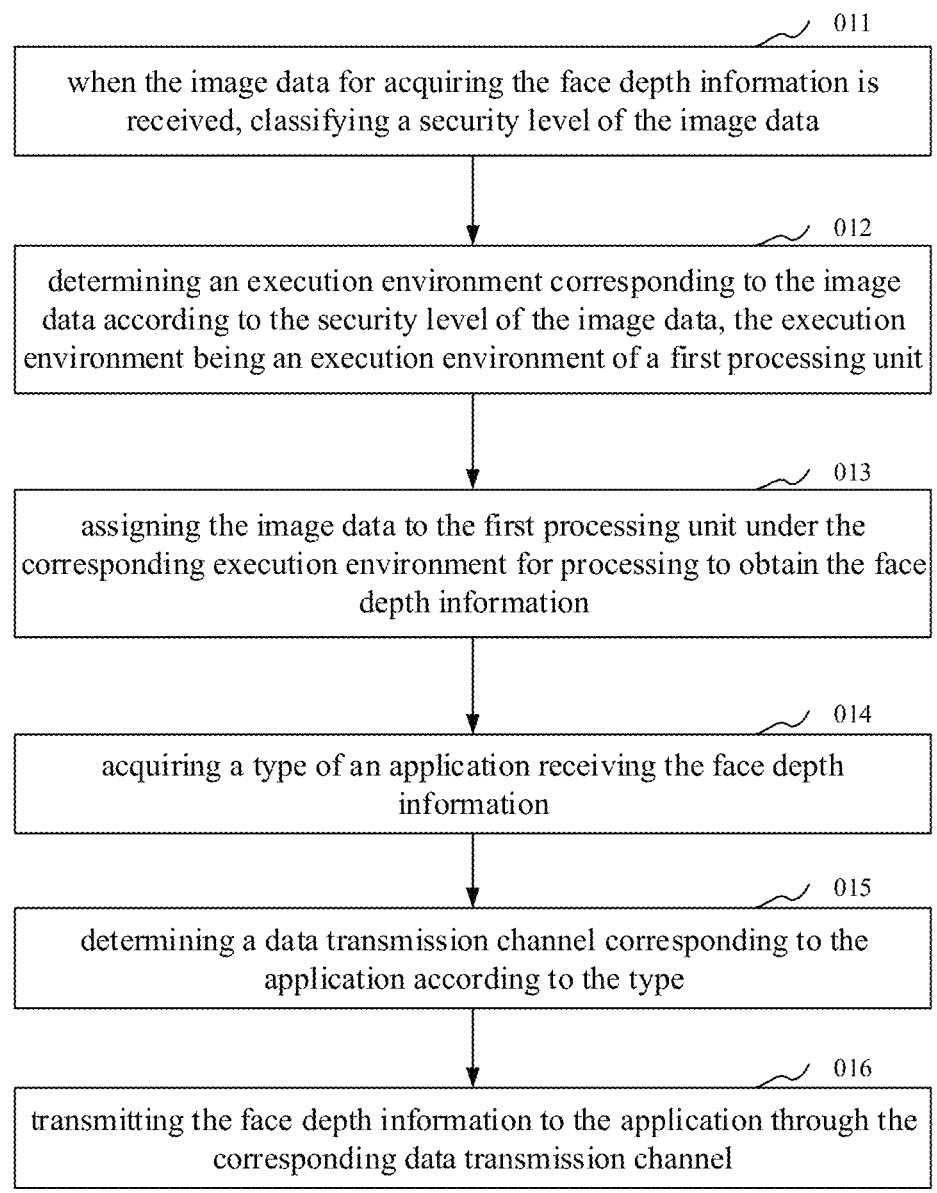

Alternatively, referring to FIG. 5, the data processing method further includes acts in the following blocks.

At block 014, a type of an application receiving the face depth information is acquired.

At block 015, a data transmission channel corresponding to the application is determined according to the type.

At block 016, the face depth information is transmitted to the application through the corresponding data transmission channel.

The first processing unit 120 may transmit the acquired face depth information to the application, such that the application may perform face unlocking, face payment and other operations. Alternatively, the first processing unit 120 may transmit the depth image to the application through either a secure channel or a normal channel. The secure channel has a different security level with the normal channel. The security level of the secure channel is higher, and the security level of the normal channel is lower. When the data is transmitted in the secure channel, the data may be encrypted to avoid data leakage or data theft. The electronic devices 10 may set the corresponding data channel according to the type of the application. Alternatively, the application with high security requirements may correspond to the secure channel, and the application with low security requirements may correspond to the normal channel. For example, a payment application corresponds to the secure channel, and an image application corresponds to the normal channel. The type of each application and the corresponding data channel for each type may be preset in the first processing unit 120. After acquiring the data channel corresponding to the type of the application, the face depth information may be transmitted to the application through the corresponding data channel, making the application proceed to the next act according to the depth image.

With the data processing method provided in embodiments of the present disclosure, the corresponding data channel is selected to transmit data according to the type of the application, which may not only ensure the security of data transmission for the application with high security requirements, but also improve the speed of data transmission for the application with low security requirements.

Figure 6:
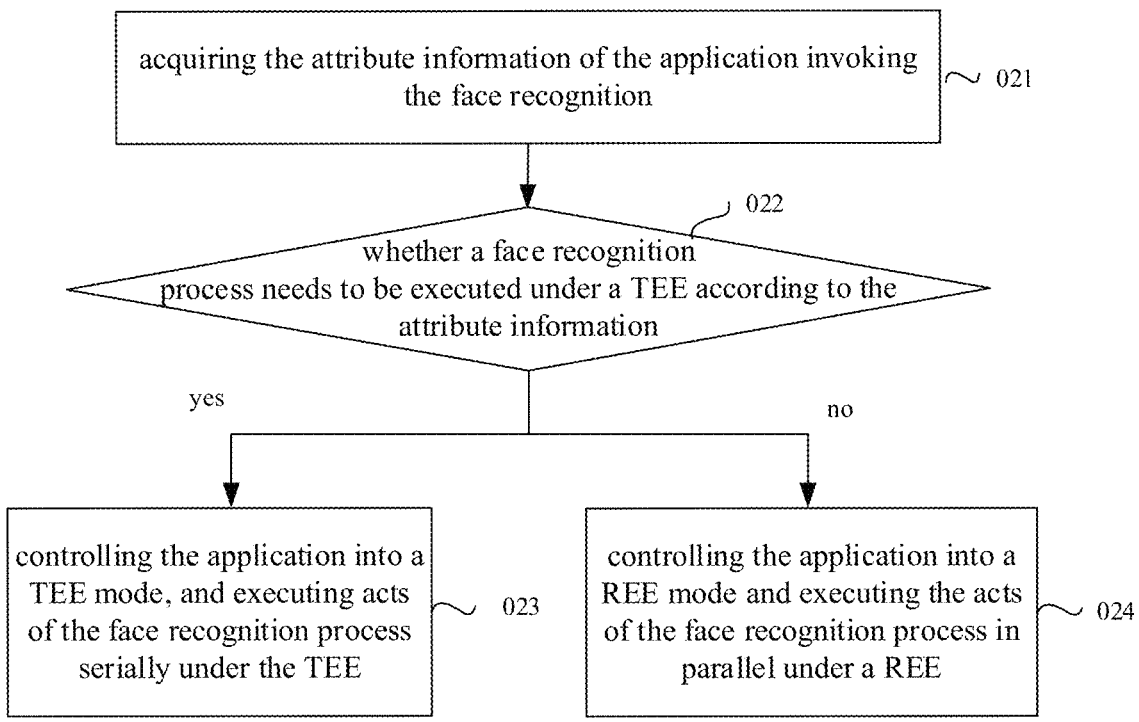

Referring to FIGS. 3 and 6, in another embodiment, the target information is attribute information of an application invoking the face recognition. The act at block 001, i.e., the target information associated with the face is received, may include an act at block 021. The act at block 002, i.e., the execution environment corresponding to the target information is determined according to the security level of the target information, and the processing related to the face is performed under the execution environment, may include acts at blocks 022, 023 and 024.

At block 021, the attribute information of the application invoking the face recognition is acquired.

At present, face recognition has been widely applicable to various scenarios, such as identity authentication, mobile payment, dynamic expression simulation, video conference and the like. All the above scenarios are designed to recognize a face by calling a camera and other hardware devices, so as to realize the function of response. Some scenarios, such as identity authentication and mobile payment, have higher security requirements on operations, while some scenarios have relatively lower security requirements on operations, such as dynamic expression simulation, video conference scenario and the like. Therefore, the data processing method provided in embodiments of the present disclosure may not only guarantee information security in the scenarios with higher security requirements, but also realize a rapid response in the scenarios with relatively lower security requirements.

In one embodiment of the present disclosure, the attribute information of the application invoking the face recognition is acquired first. The attribute information of the application may include the security level of the application. For example, a banking application, a payment application, and an identity authentication application have high security levels; and an ordinary camera application and the like have low security levels.

At block 022, it is determined whether a face recognition process needs to be executed under a TEE according to the attribute information.

In one embodiment of the present disclosure, if the security level of the application is high, the face recognition process needs to be performed under the TEE; if the security level of the application is low, the face recognition process does not need to be performed under the TEE, but only under the REE. For example, when a user uses WeChat, Alipay and other applications to pay, it needs to turn on the camera to recognize the face and compare the face with the prestored face. If the user's face is consistent with the prestored face, the verification will be successful and the payment operation will be carried out. As it involves personal payment information and the like, it is possible sometime to cause a loss of the user's personal property. Therefore, it needs to be executed under the TEE to ensure security. However, in the dynamic expression simulation, the camera is turned on to recognize the face, to track and capture facial expressions only, and then to simulate various interesting dynamic expressions to enhance the interest, so it needs to perform under the REE only.

At block 023, when the face recognition process needs to be executed under the TEE, the application is controlled into a TEE mode, and acts of the face recognition process are executed serially under the TEE.

The face recognition process may include face detection, face elements acquisition, face liveness detection and face recognition. Due to security features of the TEE, the face detection, the face elements acquisition, the face liveness detection and the face recognition are executed sequentially under the TEE. However, under the REE, the security requirements are not high, and the face detection, the face elements acquisition, the face liveness detection and the face recognition may be executed in parallel. The face detection may refer to the following. The floodlight 114 is called to emit infrared light, the laser camera 112 is employed to receive an infrared image, and the infrared image is employed to determine whether it is a face or not. The face elements acquisition may refer to the following. The visible-light camera 116 is employed to capture the face, and features related to image qualities are acquired, such as a face brightness and a face shooting angle. The face liveness detection may be to combine the infrared light and the structured light. The infrared light may be emitted by the floodlight 114, and the structured light may be emitted by the laser lamp 118, such that the infrared image and the structured-light image are received through the laser camera, and analyzed to acquire facial skin texture features and face dynamic features of multiple frames, and to establish a face three-dimensional model, to perform the liveliness detection. The face recognition may be to employ the visible-light camera 116 to take photos of the face, to acquire such features as a size of eyes, position information of a nose in the face, a length of eyebrows and the like.

In the embodiment, the face detection, the face elements acquisition, the face liveliness detection and the face recognition are executed in serial without limiting their execution order. According to the actual use of the application, the above acts may be combined arbitrarily to achieve the corresponding functions. For example, in the face payment scenario, the face liveliness detection combined with the face recognition may be required, and the face elements acquisition may be not required. It should be understood that the above scenarios are only examples and do not limit the technical solutions.

At block 024, when the face recognition process does not need to be executed under the TEE, the application is controlled into a REE mode and the acts of the face recognition process are executed in parallel under the REE.

In one embodiment of the present disclosure, under the REE, the security requirements of the face recognition process are not high. Thus, the acts of the face recognition process may be executed in parallel to improve the speed of face recognition process.

The following details explain the face detection, the face elements acquisition, the face liveliness detection and the face recognition in the face recognition process.

Figure 7:
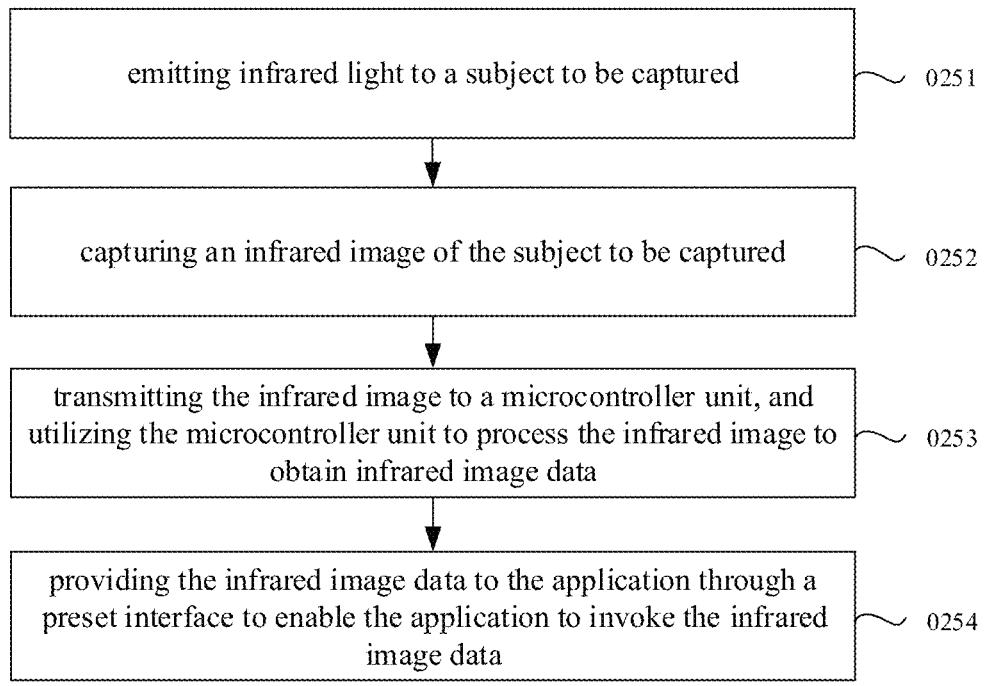

As illustrated in FIGS. 3 and 7, the face detection may include acts in the following blocks.

At block 0251, infrared light is emitted to a subject to be captured.

In detail, the infrared light may be emitted through the floodlights 114.

At block 0252, an infrared image of the subject to be captured is captured.

The infrared image of the subject to be captured is captured by the laser camera 112.

At block 0253, the infrared image is transmitted to an MCU 130, and the MCU 130 is utilized to process the infrared image to acquire infrared image data.

Due to hacking behaviors, most of which are based on the side of the application, the infrared image is thus transmitted to the MCU 130, and the infrared image is processed by the MCU 130 of hardware to prevent original data from being intercepted on the side of the application, which may effectively improve the security of the data.

At block 0254, the infrared image data is provided to the application through a preset interface to enable the application to invoke the infrared image data.

In the embodiment, the application may be employed to invoke the infrared image data to realize the face detection.

The preset interface may be a bus interface that meets a preset standard, such as a mobile industry processor interface (MIPI), an inter-integrated circuit (I2C) bus interface, a serial peripheral interface (SPI).

Figure 8:
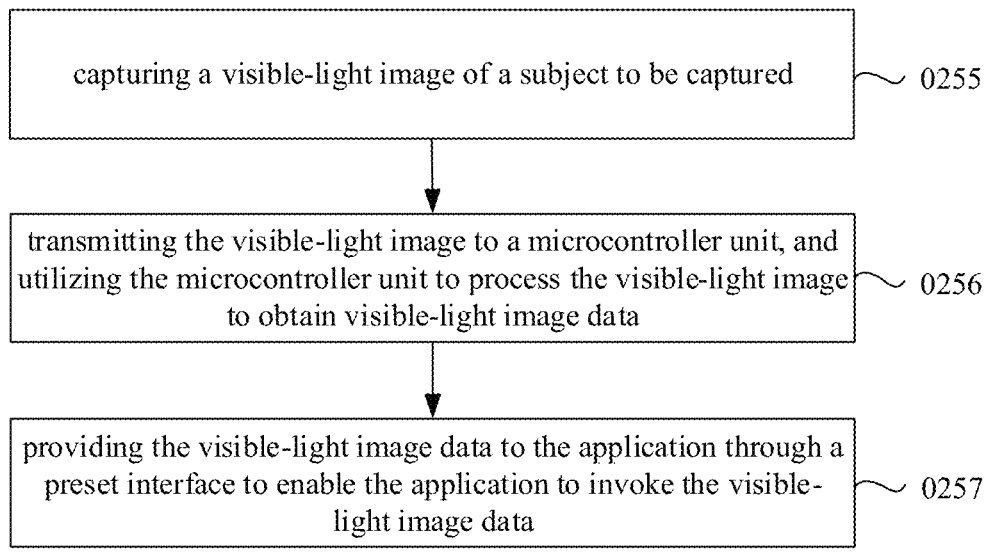

As illustrated in FIGS. 3 and 8, the face elements acquisition may include acts at the following blocks.

At block 0255, a visible-light image of a subject to be captured is captured.

In detail, the visible-light image of the subject to be captured may be captured by the visible-light camera 116.

At block 0256, the visible-light image is transmitted to the MCU, and the MCU is utilized to process the visible-light image to acquire visible-light image data.

Due to hacking behaviors, most of which are based on the side of the application, the visible-light image is thus transmitted to the MCU 130, and the visible-light image is processed by the MCU 130 of hardware to prevent original data from being intercepted on the side of the application, which may effectively improve the security of the data.

At block 0257, the visible-light image data is provided to the application through a preset interface to enable the application to invoke the visible-light image data.

In the embodiment, the application may be employed to invoke the visible-light image data to extract face elements, for example, features related to an image quality, such as a face brightness and a face shooting angle, which are acquired to serve as the data basis for the next act.

Figure 9:
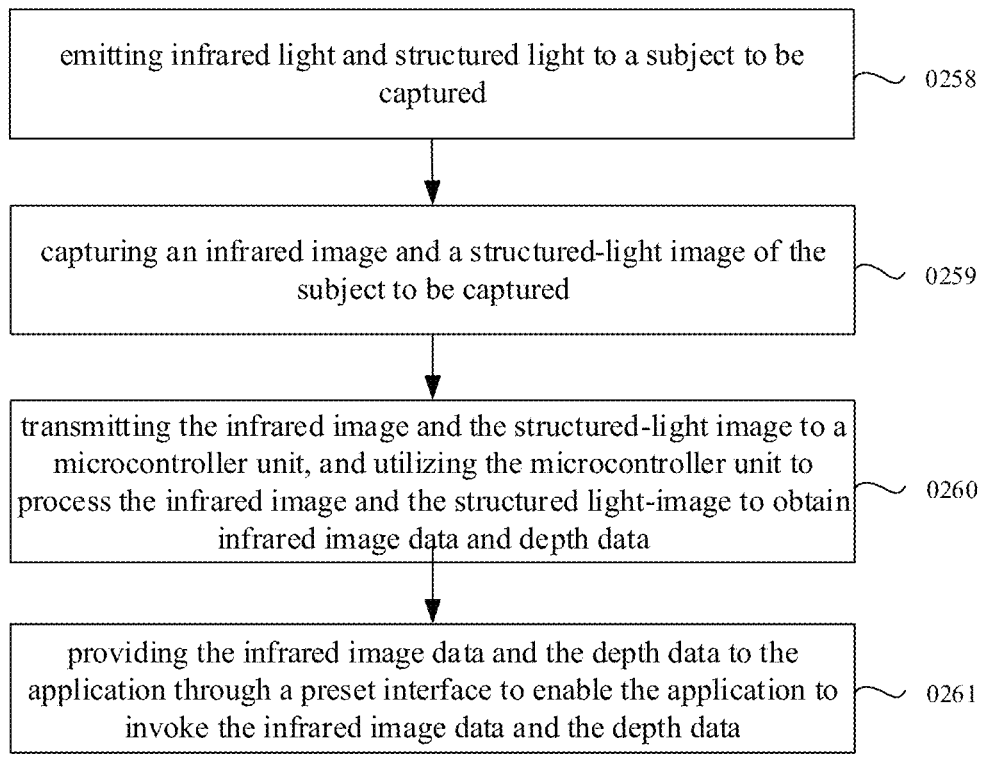

As illustrated in FIGS. 3 and 9, the face liveliness detection may include acts in the following blocks.

At block 0258, infrared light and structured light is emitted to a subject to be captured.

In one embodiment of the present disclosure, the structured light may be generated by the PWM modulation in the MCU 130, and the structured light may be emitted through the laser lamp 118 and the infrared light may be emitted through the floodlight 114 (an infrared-light emitter) to the subject to be captured.

At block 0259, an infrared image and a structured-light image of the subject to be captured are captured.

In one embodiment of the present disclosure, the infrared image and the structured-light image of the subject to be captured may be captured by the laser camera 112 (an infrared-light receiver).

At block 0260, the infrared image and the structured-light image are transmitted to the MCU 130, and the MCU 130 is utilized to process the infrared image and the structured-light image to acquire infrared image data and depth data.

In detail, the infrared image and the structured-light image may be processed by a depth engine in the MCU 130, to acquire the infrared image data and the depth data.

At block 0261, the infrared image data and the depth data are provided to the application through a preset interface to enable the application to invoke the infrared image data and the depth data to conduct security verification.

In one embodiment of the present disclosure, the MCU 130 may be employed to modulate to generate the structured light, which may be emitted to the subject to be captured through the laser lamp 118 (a structured-light projection device). Assuming that the current scenario is an identity authentication, the subject to be captured may be the user's face. After the structured light emit the subject to be captured, the structured light deforms due to the shape of the subject to be captured. By capturing the above structured-light information, the structured-light image with the profile and depth of the subject to be captured may be acquired.

The types of structured light may include a laser fringe, a gray code, a sinusoidal fringe, a heterogeneous speckle, or the like.

A fringe projection technology is illustrated by an example to show the principle. The fringe projection technology belongs to plane structured light in the broad sense.

Figure 10:
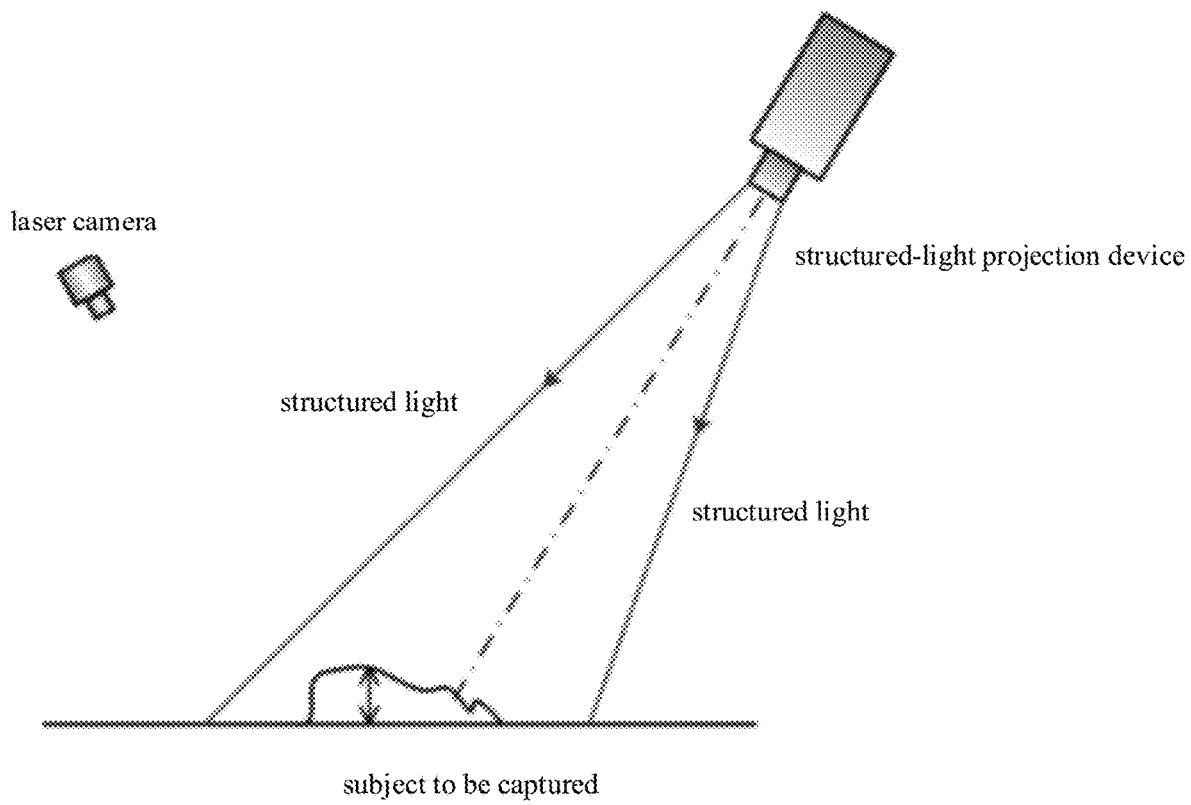
FIG. 10 is a scenario diagram of measuring a depth based on structured light according to certain embodiments of the present disclosure.

When using a plane structured-light projection, as illustrated in FIG. 10, a sinusoidal fringe is generated by the MCU 130 and the sinusoidal fringe is projected onto the subject to be captured by the laser lamp 118 (a structured-light projection device). The laser camera 112 is employed to capture a degree of curvature of the fringe modulated by the subject to be captured, demodulate the curved fringe to acquire phase, which is then converted to the full height.

It should be understood that in practical applications, the structured light employed in the embodiment of the present disclosure may be any other patterns besides the above fringe, depending on the scenario.

After that, the laser camera 112 may transmit the structured-light image to the MCU 130, and the MCU 130 is employed to calculate and acquire the corresponding depth data of the subject to be captured. In order to further improve the security, the structured-light image may be transmit to the MCU 130, the structured-light image is processed in the MCU 130 of hardware. Instead of transmitting the data directly to the application for processing, the data is already processed in the hardware, so hackers cannot access the original data, thus it is more secure. In detail, the MCU 130 may be employed to demodulate phase information corresponding to a deformed position pixel in the structured-light image, then the phase information is converted into height information, and the depth data corresponding to the subject to be captured is determined according to the height information. Finally, the processor 120 provides the depth data acquired from the MCU 130 to the application through the preset interface to enable the application to invoke the depth data. For example, based on the structured-light image of the face, a contour, a height and other data information of the face may be acquired through calculating. The above data information has been calculated in the MCU 130, and the application only needs to invoke the above data information and to perform feature comparison with the prestored data to perform identity authentication. If the identity authentication passes, the user may gain access to the application and further operate the application. For example, structured light may be employed to build a face three-dimensional model and to acquire face three-dimensional features, which may be combined with infrared image data or face dynamic features of multi-frame to conduct the face liveliness detection, thereby checking that the currently captured face is live, not a flat photo.

Figure 11:
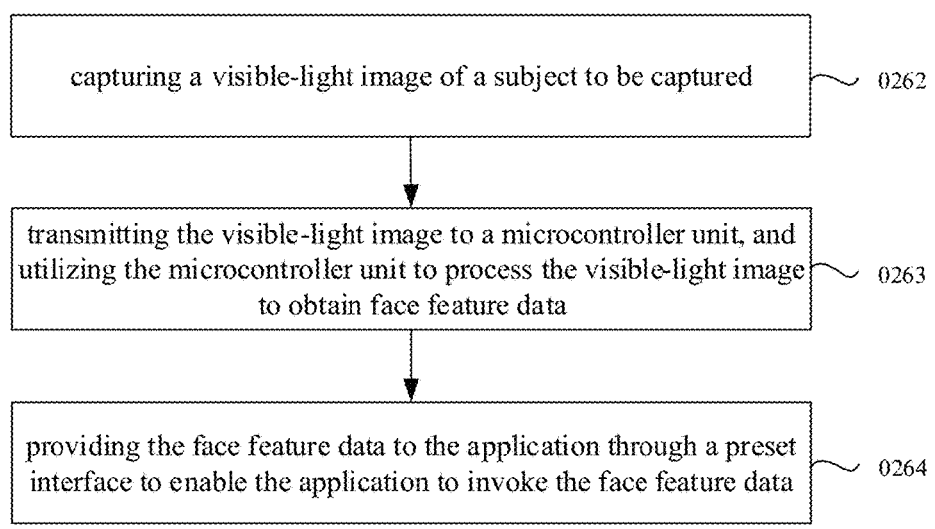
FIG. 11 is a flow chart of a data processing method according to certain embodiments of the present disclosure.

As illustrated in FIGS. 3 and 11, the face recognition may include acts in the following blocks.

At block 0262, a visible-light image of a subject to be captured is captured.

At block 0263, the visible-light image is transmitted to the MCU, and the MCU is utilized to process the visible-light image to acquire face feature data.

Due to hacking behaviors, most of which are based on the side of the application, the visible-light image is thus transmitted to the MCU 130, and the visible-light image is processed by the MCU 130 of hardware to prevent original data from being intercepted on the side of the application, which may effectively improve the security of the data.

The face feature data may include a size of eyes, a position of nose on the face, a length of eyebrows and the like.

At block 0264, the face feature data is provided to the application through a preset interface to enable the application to invoke the face feature data.

In the embodiment, the application may be employed to invoke the visible-light image data for face recognition.

With the data processing method provided in embodiments of the present disclosure, through acquiring the attribute information of the application invoking the face recognition, it is determined whether the face recognition process needs to be executed under the TEE according to the attribute information. When the face recognition process needs to be executed under the TEE, the application is controlled into the TEE mode, and the acts of the face recognition process are executed serially under the TEE, and when the face recognition process does not need to be executed under the TEE, the application is controlled into the REE mode and the acts of the face recognition process are executed in parallel under the REE. In this way, it may guarantee information security in the scenarios with high security requirements, and realize the rapid response in the scenarios with relatively low security requirements.

It should be understood that, although the acts in the above flow charts are illustrated in an order indicated by arrows, they are not necessarily executed in the order indicated by the arrows. Unless explicitly stated in the present disclosure, there is no strict order restriction on the execution of these acts, and they may be performed in any other orders. Moreover, at least some of the acts in the above flow charts may include a plurality of sub acts or stages. These sub acts or stages are not necessarily completed simultaneously, but may be executed at different moments. The order of execution of these sub acts or stages is not necessarily sequential, but may alternate or alternate with other acts or at least parts of sub acts or stages of other acts.

Figure 12:
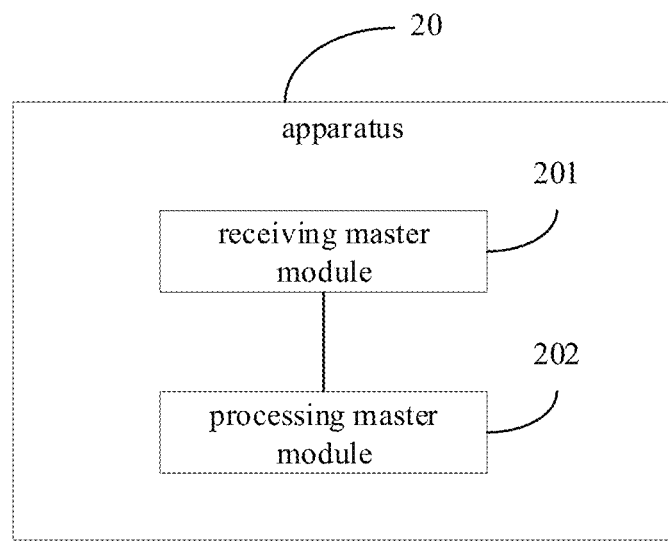
FIGS. 12 to 15 are block diagrams of a data processing apparatus according to certain embodiments of the present disclosure.

Referring to FIG. 12, the present disclosure further provides a data processing apparatus 20, which may be applicable to the electronic devices 10 as illustrated in FIG. 2 or FIG. 3. The data processing apparatus 20 may include a receiving master module 201 and a processing master module 202. The receiving master module 201 is configured to receive target information associated with a face. The processing master module 202 is configured to determine an execution environment corresponding to the target information according to a security level of the target information, and perform a processing related to the face under the execution environment.

Figure 13:
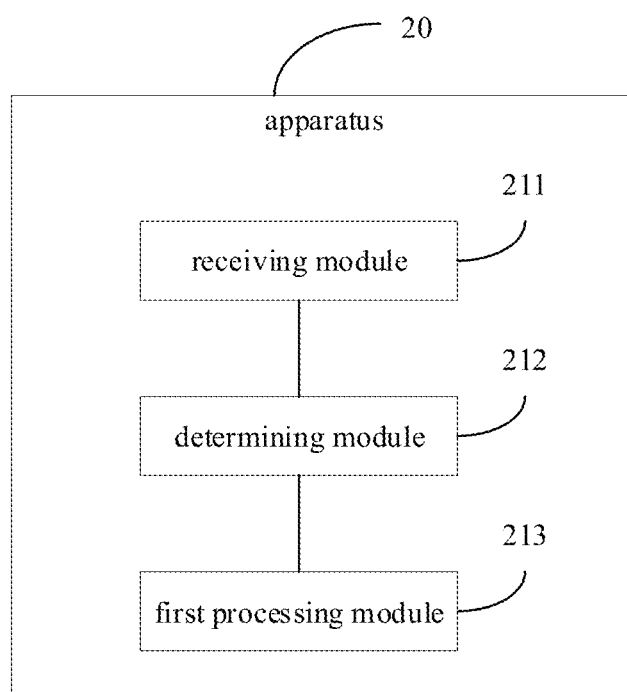

Referring to FIG. 13, in one embodiment, the target information is image data for acquiring face depth information. The receiving master module 201 includes a receiving module 211. The processing master module 202 includes a determining module 212 and a first processing module 213. The receiving module 211 is configured to, when the image data for acquiring the face depth information is received, classify a security level of the image data. The determining module 212 is configured to determine an execution environment corresponding to the image data according to the security level of the image data. The execution environment is an execution environment of a first processing unit. The first processing module 213 is configured to assign the image data to the first processing unit under the corresponding execution environment for processing to acquire the face depth information.

Alternatively, the image data may include a face image captured by a camera subassembly 110 and/or an intermediate image acquired by a second processing unit through processing the face image.

Alternatively, the image data may include an infrared image and a speckle image captured by a camera subassembly 110. A time interval between a first moment of capturing the infrared image and a second moment of capturing the speckle image is less than a first threshold.

Alternatively, the image data may include an infrared image and an RGB image captured by the camera subassembly 110. The infrared image and the RGB image are simultaneously captured by the camera subassembly.

Alternatively, the first processing module 213 is further configured to extract a set of features in the image data; and assign the set of features to the first processing unit 120 under the execution environment corresponding to the image data for processing.

Alternatively, the determining module 212 is further configured to, before acquiring the face depth information, perform a face recognition and a liveliness detection according to the image data, and determine that the face recognition on the image data passes and a detected face is live.

Figure 14:
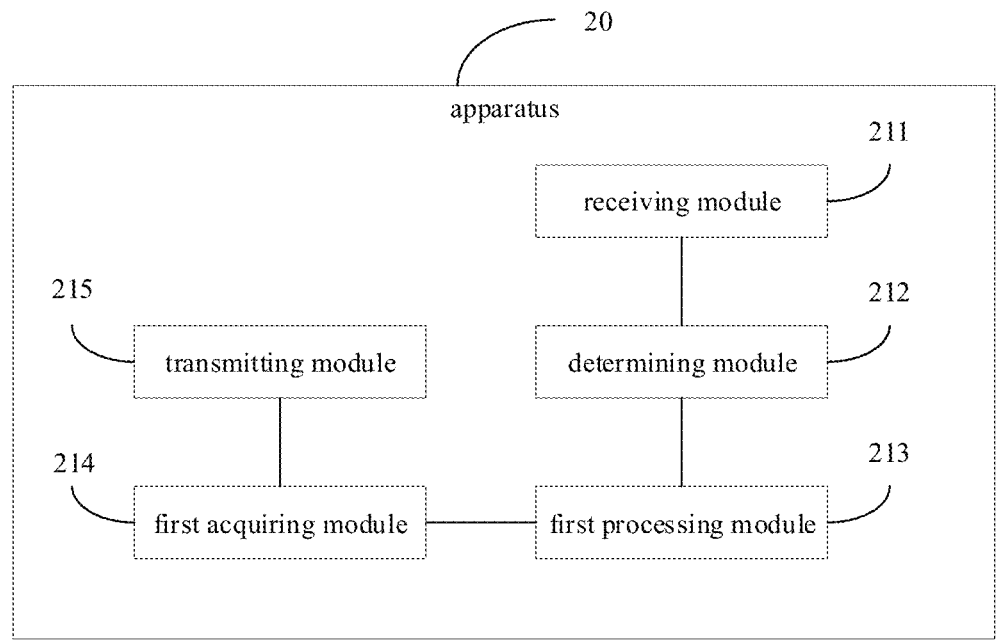

Alternatively, referring to FIG. 14, the processing master module 202 further includes a first acquiring module 214 and a transmitting module 215. The first acquiring module 214 is configured to acquire a type of an application receiving the face depth information. The determining module 212 is further configured to determine a data transmission channel corresponding to the application according to the type. The transmitting module 215 is configured to transmit the face depth information to the application through the corresponding data transmission channel.

With the data processing apparatus 20 provided in embodiments of the present disclosure, after receiving the image data, the first processing unit 120 may classify the security level of the image data, the execution environment corresponding to the image data is determined according to the security level of the image data, and the image data is assigned to the first processing unit 120 under the corresponding execution environment for processing, thus the efficiency of processing the image data is improved by different assignments on the image data.

Figure 15:
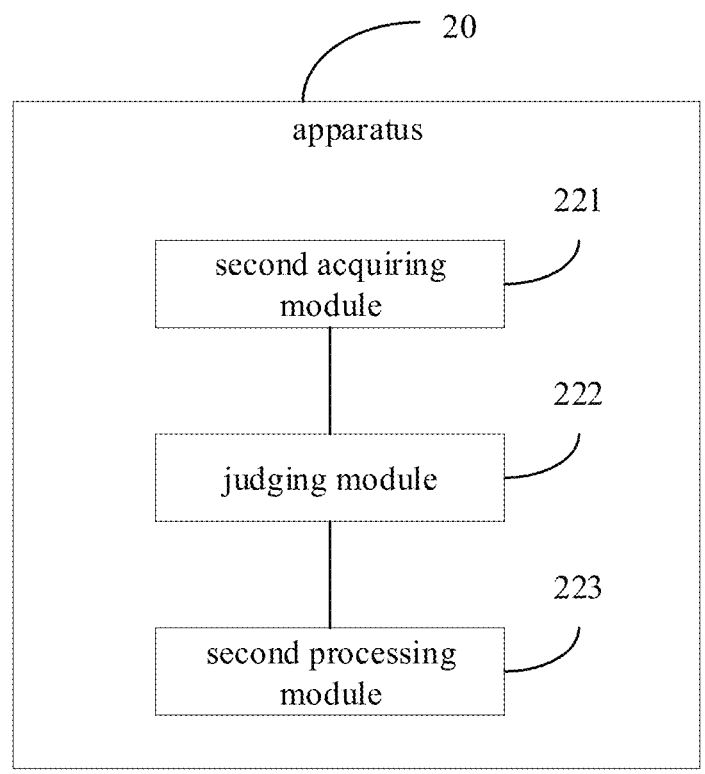

Referring to FIG. 15, in another embodiment, the target information is attribute information of an application invoking the face recognition. The receiving master module 201 includes a second acquiring module 221. The processing master module 202 includes a judging module 222 and a second processing module 223. The second acquiring module 221 is configured to acquire the attribute information of the application invoking the face recognition. The judging module 222 is configured to determine whether a face recognition process needs to be executed under a TEE according to the attribute information.

The second processing module 223 is configured to, when the face recognition process needs to be executed under the TEE, control the application into a TEE mode, and execute acts of the face recognition process serially under the TEE, and when the face recognition process does not need to be executed under the TEE, control the application into a REE mode and execute the acts of the face recognition process in parallel under the REE.

The attribute information of the application includes the security level of the application. The face recognition process includes face detection, face elements acquisition, face liveliness detection and face recognition.

Alternatively, the second processing module 223 is further configured to: emit infrared light to a subject to be captured; capture an infrared image of the subject to be captured; transmit the infrared image to the MCU 130, and utilize the MCU 130 to process the infrared image to acquire infrared image data; and provide the infrared image data to the application through a preset interface to enable the application to invoke the infrared image data.

Alternatively, the second processing module 223 is further configured to: capture a visible-light image of a subject to be captured; transmit the visible-light image to the MCU 130, and utilize MCU 130 to process the visible-light image to acquire visible-light image data; and provide the visible-light image data to the application through a preset interface to enable the application to invoke the visible-light image data.

Alternatively, the second processing module 223 is further configured to: emit infrared light and structured light to a subject to be captured; capture an infrared image and a structured-light image of the subject to be captured; transmit the infrared image and the structured-light image to the MCU 130, and utilize the MCU 130 to process the infrared image and the structured-light image to acquire infrared image data and depth data; and provide the infrared image data and the depth data to the application through a preset interface to enable the application to invoke the infrared image data and the depth data.

When the second processing module 223 transmits the infrared image and the structured-light image to the MCU 130, and utilizes the MCU 130 to process the infrared image and the structured-light image to acquire the infrared image data and the depth data, the second processing module 223 is specifically configured to demodulate phase information corresponding to a deformed position pixel in the structured-light image, convert the phase information into height information, and determine the depth data corresponding to the subject to be captured according to the height information.

Alternatively, the second processing module 223 is further configured to: capture a visible-light image of a subject to be captured; transmit the visible-light image to the MCU 130, and utilize the MCU 130 to process the visible-light image to acquire face feature data; and provide the face feature data to the application through a preset interface to enable the application to invoke the face feature data.

Alternatively, the preset interface is a bus interface that meets a preset standard, comprising: a MIPI, an I2C, and a SPI.

With the data processing apparatus 20 provided in embodiments of the present disclosure, through acquiring the attribute information of the application invoking the face recognition, it is determined whether the face recognition process needs to be executed under the TEE according to the attribute information. When the face recognition process needs to be executed under the TEE, the application is controlled into the TEE mode, and the acts of the face recognition process are executed serially under the TEE, and when the face recognition process does not need to be executed under the TEE, the application is controlled into the REE mode and the acts of the face recognition process are executed in parallel under the REE. In this way, it may guarantee information security in the scenarios with high security requirements, and realize the rapid response in the scenarios with relatively low security requirements.

The division of each module in the above data processing apparatus 20 is only used for illustration. In other embodiments, the data processing apparatus 20 may be divided into different modules as required to complete all or part of the functions of the data processing apparatus 20.

The realization of each module of the data processing apparatus 20 provided in the embodiments of the present disclosure may be in the form of computer program. The computer program may run on a terminal or server. The program modules composed of the computer program may be stored in the memory of the terminal or server. When the computer program is executed by a processor, the computer program performs the acts of the data processing method described in each embodiment of the present disclosure.

Referring to FIGS. 2 and 3, the present disclosure further provides an electronic device 10. The electronic device 10 includes: a first processing unit 120, a second processing unit 130 and a camera subassembly 110. The first processing unit 120 is configured to receive target information associated with a face and determine an execution environment corresponding to the target information according to a security level of the target information, and perform a processing related to the face under the execution environment.

Referring to FIG. 2, in one embodiment, the second processing unit is coupled to the first processing unit and the camera subassembly. The target information includes image data for acquiring face depth information. The first processing unit 120 is configured to: when the image data for acquiring the face depth information is received, classify a security level of the image data; determine an execution environment corresponding to the image data according to the security level of the image data, in which the execution environment is an execution environment of the first processing unit; and assign the image data to the first processing unit 120 under the corresponding execution environment for processing to acquire the face depth information.

Alternatively, the image data may include a face image captured by the camera subassembly 110 and/or an intermediate image acquired by the second processing unit 130 through processing the face image.

Alternatively, the image data include an infrared image and a speckle image captured by the camera subassembly 110. A time interval between a first moment of capturing the infrared image and a second moment of capturing the speckle image is less than a first threshold.

Alternatively, the image data may include an infrared image and an RGB image captured by the camera subassembly 110. The infrared image and the RGB image are simultaneously captured by the camera subassembly 110.

Alternatively, the first processing unit 120 is configured to assign the image data to the first processing unit 120 under the corresponding execution environment for processing by acts of: extracting a set of features in the image data; and assigning the set of features to the first processing unit 120 under the execution environment corresponding to the image data for processing.

Alternatively, the first processing unit 120 is further configured to, before acquiring the face depth information, perform a face recognition and a liveness detection according to the image data, and determine that the face recognition on the image data passes and a detected face is live.

Alternatively, the first processing unit 120 is further configured to acquire a type of an application receiving the face depth information, determine a data transmission channel corresponding to the application according to the type, transmit the face depth information to the application through the corresponding data transmission channel.

With the electronic device 10 provided in embodiments of the present disclosure, after receiving the image data, the first processing unit 120 may classify the security level of the image data, the execution environment corresponding to the image data may be determined according to the security level of the image data, and the image data may be assigned to the first processing unit 120 under the corresponding execution environment for processing, thus the efficiency of processing the image data is improved by different assignments on the image data.

Referring to FIG. 3, in another embodiment, the camera subassembly 110 includes a laser camera 112, a floodlight 114, a visible-light camera 116 and a laser lamp 118. The second processing unit 130 is a MCU 130 and the first processing unit 120 is a processor 120. The target information includes attribute information of an application invoking the face recognition. The laser camera 112, the floodlight 114, the visible-light camera 116 and the laser lamp 118 are coupled to the MCU 130. The MCU 130 is coupled to the processor 120. The processor 120 is configured to: acquire the attribute information of the application invoking the face recognition; determine whether a face recognition process needs to be executed under a TEE according to the attribute information; when the face recognition process needs to be executed under the TEE, control the application into a TEE mode, and execute acts of the face recognition process serially under the TEE; and when the face recognition process does not need to be executed under the TEE, control the application into a REE mode and execute the acts of the face recognition process in parallel under the REE.

Alternatively, the attribute information of the application includes the security level of the application. Alternatively, the face recognition process includes face detection, face elements acquisition, face liveliness detection and face recognition.

Alternatively, in the face detection, the floodlight 114 is configured to emit infrared light to a subject to be captured. The laser camera 112 is configured to capture an infrared image of the subject to be captured, and transmit the infrared image to the MCU 130. The MCU 130 is configured to process the infrared image to acquire infrared image data. The processor 120 is configured to provide the infrared image data to the application through a preset interface to enable the application to invoke the infrared image data.

Alternatively, in the face elements acquisition, the visible-light camera 116 is configured to capture a visible-light image of a subject to be captured and transmit the visible-light image to the MCU 130. The MCU 130 is configured to process the visible-light image to acquire visible-light image data. The processor 120 is configured to provide the visible-light image data to the application through a preset interface to enable the application to invoke the visible-light image data.

Alternatively, in the face liveliness detection, the floodlight 114 is configured to emit infrared light to a subject to be captured, and the laser lamp 118 is configured to emit structured light to the subject to be captured. The laser camera 112 is configured to capture an infrared image and a structured-light image of the subject to be captured and transmit the infrared image and the structured-light image to the MCU 130. The MCU 130 is configured to process the infrared image and the structured-light image to acquire infrared image data and depth data. The processor 120 is configured to provide the infrared image data and the depth data to the application through a preset interface to enable the application to invoke the infrared image data and the depth data.

Alternatively, when the MCU 130 processes the infrared image and the structured-light image to acquire the infrared image data and depth data, the MCU 130 is specifically configured to demodulate phase information corresponding to a deformed position pixel in the structured-light image, convert the phase information into height information, and determine the depth data corresponding to the subject to be captured according to the height information.

Alternatively, in the face recognition, the visible-light camera 116 is configured to capture a visible-light image of a subject to be captured and transmit the visible-light image to the MCU 130. The MCU 130 is configured to process the visible-light image to acquire face feature data. The processor 120 is configured to provide the face feature data to the application through a preset interface to enable the application to invoke the face feature data.

With the electronic device 10 provided in embodiments of the present disclosure, through acquiring the attribute information of the application invoking the face recognition, it is determined whether the face recognition process needs to be executed under the TEE according to the attribute information. When the face recognition process needs to be executed under the TEE, the application is controlled into the TEE mode, and the acts of the face recognition process are executed serially under the TEE, and when the face recognition process does not need to be executed under the TEE, the application is controlled into the REE mode and the acts of the face recognition process are executed in parallel under the REE. In this way, it may guarantee information security in the scenarios with high security requirements, and realize the rapid response in the scenarios with relatively low security requirements.

Figure 16:
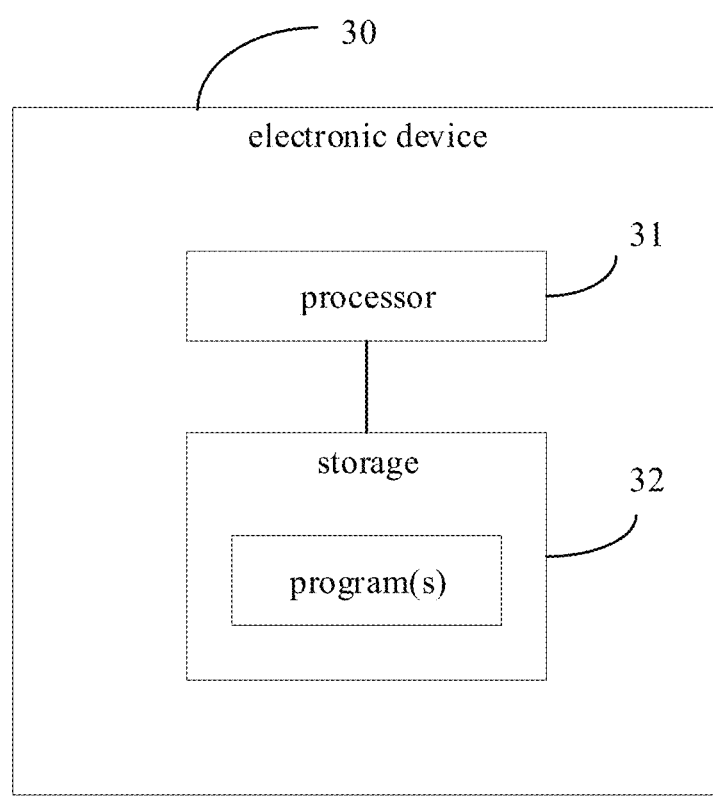
FIG. 16 is a block diagram of an electronic device according to certain embodiments of the present disclosure.

Referring to FIG. 16, the present disclosure further provides an electronic device 30. The electronic device 30 includes one or more processors 31, a memory 32, and one or more programs. The one or more of programs are stored in the memory 32 and configured to be executed by the one or more processors 31. The program includes instructions for executing the data processing method described in any of the above embodiments.

For example, the program includes instructions for the data processing method to perform the following acts.

At act 011, when image data for acquiring face depth information is received, a security level of the image data is classified.

At act 012, an execution environment corresponding to the image data is determined according to the security level of the image data. The execution environment is an execution environment of the first processing unit 120.

At act 013, the image data is assigned to the first processing unit 120 under the corresponding execution environment for processing to acquire the face depth information.

For example, the program further includes instructions for the data processing method to perform the following acts.

At act 021, attribute information of an application invoking the face recognition is acquired.

At act 022, it is determined whether a face recognition process needs to be executed under a TEE according to the attribute information.

At act 023, when the face recognition process needs to be executed under the TEE, the application is controlled into a TEE mode, and acts of the face recognition process are executed serially under the TEE.

At act 024, when the face recognition process does not need to be executed under the TEE, the application is controlled into a REE mode and the acts of the face recognition process are executed in parallel under the REE.

The present disclosure further provides a computer-readable storage medium. When computer executable instructions are executed by one or more processors, it causes the one or more processors to perform the acts of the data processing method described in any of the embodiments of the present disclosure.

The present disclosure also provides a computer program product containing instructions. When the computer program product runs on a computer, the computer program product causes the computer to perform the acts of the data processing method described in any of the embodiments of the present disclosure.

Any reference to a memory, a storage, a database or other media used in the present disclosure may include a nonvolatile and/or volatile memory. A suitable nonvolatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM), which serves as an external cache memory. RAM is available in various forms as an illustration rather than a limitation, such as a static RAM (SRAM), a dynamic RAM (DRAM), a synchronous DRAM (SDRAM), a dual data rate SDRAM (DDR SDRAM), an enhanced SDRAM (ESDRAM), a synchronous link (Synchlink) DRAM (SLDRAM), a memory bus (Rambus) direct RAM (RDRAM), a direct memory bus dynamic RAM (DRDRAM), and a memory bus dynamic RAM (RDRAM).

The above embodiments only express several embodiments of the present disclosure, and their description is relatively specific and detailed, but it cannot be interpreted as the limitation of the scope of the present disclosure. It should be noted that, for those skilled in the art, certain deformation and improvement may be made without deviating from the concepts of the present disclosure, which all belong to the scope of protection of the present disclosure. Therefore, the scope of protection of the present disclosure shall be subject to be captured to the attached claims.

What is claimed is:

1. A method for data processing, comprising:
receiving target information associated with a face, wherein the target information comprises image data for acquiring face depth information;
determining a security level of the image data;
determining an execution environment corresponding to the target information according to a security level of the target information; and
performing a processing related to the face based on the target information under the execution environment,
wherein determining the execution environment corresponding to the target information according to the security level of the target information, and performing the processing related to the face based on the target information under the execution environment comprises:
determining an execution environment corresponding to the image data according to the security level of the image data, the execution environment being an execution environment of a first processing unit; and
assigning the image data to a processing kernel under the execution environment corresponding to the image data in the first processing unit for processing to acquire the face depth information based on the image data.

2. The method of claim 1, wherein the image data comprises at least one of: a face image captured by a camera subassembly or an intermediate image acquired by a second processing unit through processing the face image;
or, wherein the image data comprises an infrared image and a speckle image captured by the camera subassembly, wherein a time interval between a first moment of capturing the infrared image and a second moment of capturing the speckle image is less than a first threshold;
or wherein the image data comprises the infrared image and an RGB image captured by the camera subassembly, wherein the infrared image and the RGB image are simultaneously captured by the camera subassembly.

3. The method of claim 1, wherein assigning the image data to the processing kernel under the execution environment corresponding to the image data in the first processing unit for processing comprises:

extracting a set of features in the image data; and
assigning the set of features to the processing kernel under the execution environment corresponding to the image data in the first processing unit for processing.

4. The method of claim 1, further comprising:
performing a face recognition and a liveness detection according to the image data.

5. The method of claim 1, further comprising:
acquiring a type of an application receiving the face depth information;
determining a data transmission channel corresponding to the application according to the type; and
transmitting the face depth information to the application through the corresponding data transmission channel.

6. The method of claim 1, wherein the target information comprises attribute information of an application invoking a face recognition process; and
wherein performing the processing related to the face based on the target information under the execution environment comprises:
controlling the application into a trusted execution environment mode and executing acts of the face recognition process serially under the trusted execution environment; or,
controlling the application into a rich execution environment mode and executing acts of the face recognition process in parallel under a rich execution environment.

7. The method of claim 6, wherein the attribute information of the application comprises a security level of the application; and
wherein the face recognition process comprises at least one of: face detection, face elements acquisition, face liveness detection or face recognition.

8. The method of claim 7, wherein the face detection comprises determining whether there is a face based on an infrared image or infrared image data; and
wherein the method further comprises:
emitting infrared light to a subject to be captured;
capturing the infrared image of the subject to be captured; and
providing the infrared image to the application through a preset interface to enable the application to invoke the infrared image,
or
emitting infrared light to a subject to be captured;
capturing the infrared image of the subject to be captured;
transmitting the infrared image to a microcontroller unit, and utilizing the microcontroller unit to process the infrared image to acquire the infrared image data; and
providing the infrared image data to the application through a preset interface to enable the application to invoke the infrared image data.

9. The method of claim 7, wherein the face elements acquisition comprises extracting features related to an image quality based on a visible-light image or visible-light image data; and
wherein the method further comprises:
capturing the visible-light image of a subject to be captured; and
providing the visible-light image to the application through a preset interface to enable the application to invoke the visible-light image,
or
capturing the visible-light image of a subject to be captured;
transmitting the visible-light image to a microcontroller unit, and utilizing the microcontroller unit to process the visible-light image to acquire the visible-light image data; and
providing the visible-light image data to the application through a preset interface to enable the application to invoke the visible-light image data.

10. The method of claim 7, wherein the face liveness detection comprises detecting whether a current face is live based on an infrared image and a structured-light image, or based on infrared image data and depth data; and
wherein the method further comprises:
emitting infrared light and structured light to a subject to be captured;
capturing the infrared image and the structured-light image of the subject to be captured; and
providing the infrared image and the structured-light image to the application through a preset interface to enable the application to invoke the infrared image and the structured-light image,
or
emitting infrared light and structured light to a subject to be captured;
capturing the infrared image and the structured-light image of the subject to be captured
transmitting the infrared image and the structured-light image to a microcontroller unit, and utilizing the microcontroller unit to process the infrared image and the structured-light image to acquire the infrared image data and the depth data; and
providing the infrared image data and the depth data to the application through a preset interface to enable the application to invoke the infrared image data and the depth data.

11. The method of claim 7, wherein the face recognition comprises recognizing a face based on a visible-light image or face feature data; and
wherein the method further comprises:
capturing the visible-light image of a subject to be captured; and
providing the visible-light image to the application through a preset interface to enable the application to invoke the visible-light image,
or
capturing the visible-light image of a subject to be captured;
transmitting the visible-light image to a microcontroller unit, and utilizing the microcontroller unit to process the visible-light image to acquire the face feature data;
and
providing the face feature data to the application through a preset interface to enable the application to invoke the face feature data.

12. The method of claim 10, wherein utilizing the microcontroller unit to process the infrared image and the structured-light image to acquire the infrared image data and the depth data comprises:
demodulating phase information corresponding to a deformed position pixel in the structured-light image;
converting the phase information into height information; and
determining the depth data corresponding to the subject to be captured according to the height information.

13. The method of claim 10, wherein the preset interface is a bus interface that meets a preset standard, comprising: a mobile industry processor interface, an inter-integrated circuit bus interface, a serial peripheral interface.

14. An electronic device, comprising a camera subassembly, a first processing unit and a second processing unit, wherein the second processing unit is coupled to the first processing unit and the camera subassembly, and the first processing unit is configured to:
receive target information associated with a face, wherein the target information comprises image data for acquiring face depth information;
determine a security level of the image data;
determine an execution environment corresponding to the image data according to a security level of the image data, the execution environment being an execution environment of the first processing unit; and
assign the image data to a processing kernel under the execution environment corresponding to the image data in the first processing unit for processing to acquire the face depth information based on the image data.

15. The electronic device of claim 14, wherein the first processing unit is configured to assign the image data to the processing kernel under the execution environment corresponding to the image data in the first processing unit for processing by acts of: extracting a set of features in the image data; and assigning the set of features to the processing kernel under the execution environment corresponding to the image data in the first processing unit for processing.

16. The electronic device of claim 14, wherein the first processing unit is further configured to:
acquire a type of an application receiving the face depth information;
determine a data transmission channel corresponding to the application according to the type; and
transmit the face depth information to the application through the corresponding data transmission channel.

17. The electronic device of claim 14, wherein the target information comprises attribute information of an application invoking a face recognition process, the camera subassembly comprises a laser camera, a floodlight, a visible-light camera and a laser lamp, the second processing unit is a microcontroller unit and the first processing unit is a processor, wherein the processor is configured to:
control the application into a trusted execution environment mode, and execute acts of the face recognition process serially under the trusted execution environment; or
control the application into a rich execution environment mode, and execute acts of the face recognition process in parallel under the rich execution environment.

18. A non-transitory computer-readable storage medium, configured to store computer programs that, when executed by a processor, implement a data processing method comprising:
receiving target information associated with a face, wherein the target information comprises image data for acquiring face depth information;
determining a security level of the image data;
determining an execution environment corresponding to the image data according to a security level of the image data, the execution environment being an execution environment of a first processing unit; and
assigning the image data to a processing kernel under the execution environment corresponding to the image data in the first processing unit for processing to acquire the face depth information based on the image data.

\* \* \* \* \*